Figure 1:
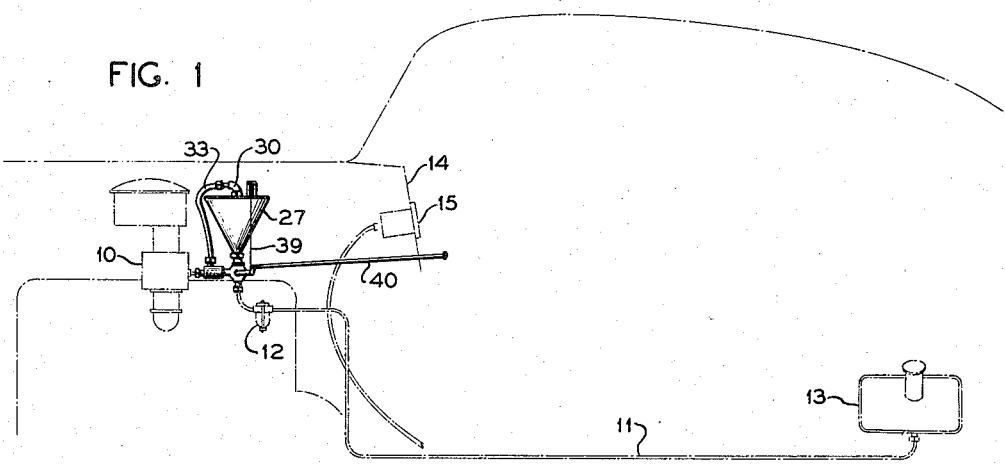

April 24, 1951 — W. S. COMPTON — 2,550,227

FUEL MILEAGE TESTER

Filed Jan. 25, 1949

*INVENTOR.*
W. S. COMPTON

BY

A. Yates Dowell
ATTORNEY

Patented Apr. 24, 1951

2,550,227

UNITED STATES PATENT OFFICE 2,550,227

FUEL MILEAGE TESTER

William Sam Compton, Birmingham, Ala.

Application January 25, 1949, Serial No. 72,660

8 Claims. (Cl. 73—113)

This invention relates to measuring devices and more particularly to those employed in testing or measuring the operation of automobiles and other powered devices for determining the distance driven or the operation upon a certain quantity of liquid fuel.

It is important to know the amount of fuel consumed for a given result in internal combustion engines, and particularly present day automobiles, economical operation being desirable and frequently contributing in the acquisition or disposition of the automobile.

The most common way of determining fuel consumption is to fill the tank of the automobile and check the speedometer reading at the time, then after driving until the tank is substantially empty to refill the tank to determine the amount of fuel consumed and dividing the number of miles by the number of gallons of fuel consumed.

Independent fuel tanks have also been proposed for this purpose upon the fuel of which the engines would be allowed to operate until the tanks became empty. However, such structures are unsatisfactory because they are too troublesome to operate as well as too expensive and unreliable.

It is an object of the invention to provide a simple, inexpensive, efficient and reliable fuel mileage tester which is simple to install and operate and which can be utilized with minimum effort during actual driving of the automobile to determine the amount of fuel that is being consumed for any desired distance and speed.

A further object of the invention is to provide a device which can be inserted in the fuel line adjacent the carburetor and allowed to remain there and which may be used whenever desired by manipulating a simple control on the dash or other convenient location of the automobile to ascertain the operation of the engine per unit of measurement of fuel.

Briefly stated, the invention comprises a substantially conical fuel container or receptacle connected by means of a three-way valve to a fuel line leading from the fuel pump to the carburetor so that when the valve is in one position flow is permitted through the valve and fuel container to the carburetor in the normal manner, but upon movement of the valve the supply of fuel will be cut off and fuel in the substantially conical container can flow by gravity downwardly from the container and three-way valve to the carburetor, due to the admission of air into the top of the conical container through a valve by means of which air is admitted into the conical container. The admission of such air is controlled by a cable having one end attached to the end of the petcock and its other end attached to the end of a steel spring which engages the valve causing it to unseat.

The invention contemplates that the conical container will accommodate along with the amount of fuel in the line and in the carburetor $\frac{1}{10}$ of a gallon so that upon exhaustion of the same and the multiplication of the difference in mileage readings by 10 the mileage per gallon can be determined.

Figure 2:
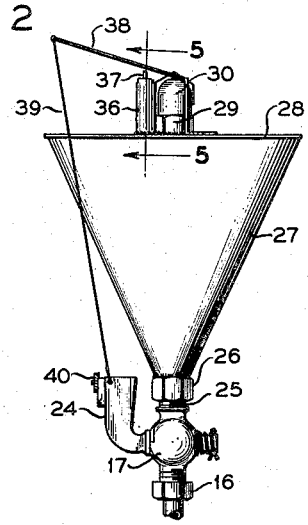
Figure 3:
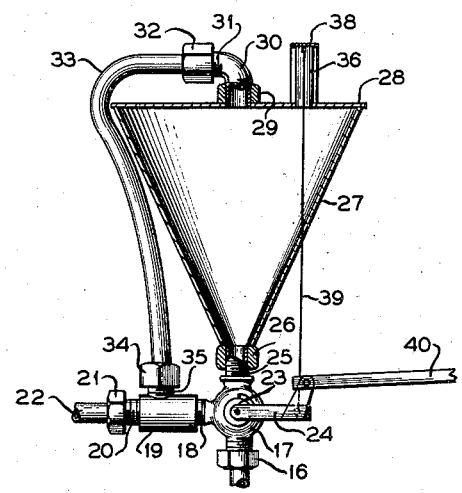
Figure 4:
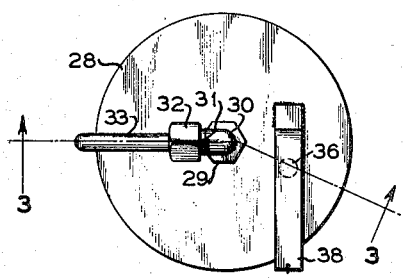

Further objects and advantages of the invention will be apparent from the following description taken in conjunction with the drawings, wherein:

Figure 1 is a diagrammatic view illustrating one application of the invention;

Fig. 2, an enlarged elevation;

Fig. 3, a vertical section on the line 3—3 of Fig. 4;

Fig. 4, a top plan view; and

Figure 5:
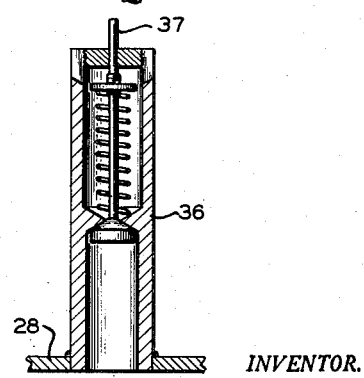

Fig. 5, an enlarged sectional view on the line 5—5 of Fig. 2.

With continued reference to the drawings, the carburetor 10 of a conventional automobile is supplied with gasoline or other liquid fuel through a fuel line 11 by means of a pump 12 from a tank 13. The amount of fuel in the tank is indicated on the instrument panel or dash 14 of the automobile, such parts being conventional. The instrument panel or dash includes the usual instruments including a speedometer 15 indicating the mileage of the vehicle.

In order to determine the amount of mileage per gallon of gasoline with this equipment, it is necessary that the speedometer reading be taken when the tank is filled and when it is substantially empty and the tank refilled to determine how much fuel has been consumed.

The method just described of measuring the mileage is unsatisfactory and accordingly can be simplified by the present invention which comprises shutting off the flow through the fuel line and admitting a predetermined amount of liquid fuel and measuring the mileage covered during the consumption of the same.

Specifically on the fuel line from the fuel pump to the carburetor is connected by a threaded coupling 16 a three-way valve 17 having its right angular threaded discharge connection 18 united to a T coupling 19 having a threaded portion 20 for the reception of a nut 21 joining the same to the carburetor inlet. The three-way valve is provided with a rotary valve member 23 controlled by a handle 24 so that when in one position as shown in Fig. 2 fuel can travel from the fuel pump through the three-way valve and its threaded outlet 25 and the nut 26 into a substantially conical gas container 27 attached by the nut to the valve body.

The container 27 is provided with a top or cover 28 having a compression nut 29 at its top providing for the discharge of fuel through an elbow 30 having a threaded discharge end 31 to which is attached a nut 32 joining tubing 33 to the coupling 30. The opposite end of the tubing is connected by a nut 34 with a threaded thimble 35 tapped into the T 19.

Thus when the valve is in normal operating position fuel can flow through the three-way valve upwardly into the container and from the top of the same and through the tube 33 back into the fuel line to the carburetor. When the three-way valve is in its other position, fuel to the container 27 will be cut off and the full fuel contents of the container can then flow by gravity through the three-way valve and T coupling into the carburetor.

An air valve casing 36 is mounted on the cover for the container 27 and contains a conventional air valve having a stem 37 for admitting air into the container 27 to facilitate flow by gravity into the carburetor. The stem 37 is adapted to be unseated by means of a steel spring 38 mounted on the cover 28 of the container. The outer end of the steel spring is connected by a cable 39 with the arm 24 of the three-way valve so that when this arm is in uppermost position no pressure will be exerted on the steel spring 38, and the valve 36 will be closed. Fuel will then flow from the fuel pump through the three-way valve upwardly through the container 27 and around through the pipe 33 and the T 19 into the carburetor. When it is desired to make a test the arm 24 is moved to horizontal position by an operating member 40 cutting off fuel from the fuel pump. On account of the cable 39 the steel spring 38 will be moved downwardly into contact with the valve stem 37, admitting air into the chamber 27 and permitting the fuel to flow from the container 27 by gravity through the three-way valve and through the connecting T to the carburetor.

The substantially cone-shaped container has a capacity of substantially 19 3/10 cubic inches, and the tubing and fittings contain substantially 0.47 cubic inch, while the carburetor has a capacity of 3.33 cubic inches, the sum of all of which is 23.1 cubic inches or 1/10 of a gallon the total volume used in each test. Thus exact information can be easily and simply obtained.

It will thus be apparent that an extremely simple, inexpensive but accurate and satisfactory device is provided by means of which the desired information can be obtained, regardless of the speed of the automobile or the manner in which it is driven. Also, the test can be taken during the maintenance of any desired speed to determine the most efficient driving speed for the automobile.

What is claimed is:

1. A fuel mileage tester for use on a vehicle including a carburetor comprising a substantially conical container for liquid fuel and having an inlet in its bottom and an outlet at its top, an air valve also in said top for the admission of air into said container, said air valve having an exposed valve stem by means of which the valve may be unseated, a three-way valve communicating with the lower end of said container for receiving, when in one position, liquid fuel so that such fuel may flow directly into and upwardly through said container, a T coupling connected to the third opening of said three-way valve, a connection between said T coupling and the carburetor, a tube joining the upper end of the chamber with said T coupling so that flow upwardly through the chamber and through the valve may pass to the carburetor, and so that when the three-way valve is in another position liquid fuel may gravitate through the three-way valve and T coupling to the carburetor, a steel spring engageable with said valve stem for unseating said air valve, a connection between said steel spring and said three-way valve so that when said valve is in one position, said spring will be operated to open said air valve, and means extending to the dash of the automobile for operating said three-way valve.

2. A fuel mileage tester for use on a vehicle including a carburetor comprising a container for liquid fuel and having an inlet in its bottom and an outlet at its top, a three-way valve communicating with the lower end of said container for receiving when in one posoition liquid fuel so that such fuel may flow directly into and upwardly through said container, a T coupling connected to the third opening of said three-way valve, a connection between said T coupling and the carburetor, a tube joining the upper end of the chamber with said T coupling so that flow upwardly through the chamber and through the valve may pass to the carburetor, and so that when the three-way valve is in another position liquid fuel may gravitate through the three-way valve and T coupling to the carburetor, and means extending to the dash of the automobile for operating said three-way valve.

3. A fuel mileage tester for use on a vehicle including a carburetor comprising a container for liquid fuel and having an inlet in its bottom and an outlet at its top, three-way valve means communicating with the lower end of said container a fuel source connected to said valve for supplying liquid fuel so that such fuel may flow directly into and upwardly through said container, a T coupling connected to said valve means and to the carburetor, a tube joining the upper end of the chamber with said T coupling so that flow upwardly through the chamber and through the valve may pass to the carburetor, said valve means being operable to another position to shut off liquid supply from said source and permit fuel flow from said container through the T coupling to the carburetor.

4. A fuel mileage tester comprising a container for liquid fuel adapted to be placed in the fuel line and having an inlet in its bottom and an outlet at its top requiring the chamber to be filled at all times in order to have fuel flow through said outlet, a fuel connection from the upper portion of the chamber to said fuel line beyond said container, a second fuel connection from the lower portion of said container to said fuel line beyond said container, valve means adjacent the lower end of said container for interrupting the flow of fuel to said container and for controlling the flow of fuel through said fuel connections and by means of which fuel may be caused to flow through said chamber and through the first of said connections or the flow of fuel to said chamber interrupted and the fuel already in said chamber permitted to flow by gravity from said chamber and through the second of said connections.

5. A fuel mileage tester comprising a container for liquid fuel adapted to be placed in the fuel line and having an inlet in its bottom and an outlet at its top requiring the chamber to be filled at all times in order to have fuel flow through said outlet, a fuel connection from the upper portion of the chamber to said fuel line beyond said container, a second fuel connection from the lower portion of said container to said fuel line beyond said container, valve means adjacent the lower end of said container for interrupting the flow of fuel to said container and for controlling the flow of fuel through said fuel connections and means of which fuel may be caused to flow through said chamber and through the first of said connections or the flow of fuel to said chamber interrupted the fuel already in said chamber permitted to flow by gravity from said chamber and through the second of said connections, and means for admitting air into the upper portion of said chamber for facilitating gravity flow of fuel from said chamber.

6. A fuel mileage tester comprising a container for liquid fuel adapted to be placed in the fuel line and having an inlet in its bottom and an outlet at its top requiring the chamber to be filled at all times in order to have fuel flow through said outlet, a fuel connection from the upper portion of the chamber to said fuel line beyond said container, a second fuel connection from the lower portion of said container to said fuel line beyond said container, valve means adjacent the lower end of said container for interrupting the flow of fuel to said container and for controlling the flow of fuel through said fuel connections and by means of which fuel may be caused to flow through said chamber and through the first of said connections or the flow of fuel to said chamber interrupted the fuel already in said chamber permitted to flow by gravity from said chamber and through the second of said connections, actuating means for said valve and means for admitting air into the upper portion of said chamber for facilitating gravity flow of fuel from said chamber, said last mentioned means being connected to said valve actuating means in a manner to be controlled thereby.

7. A fuel mileage tester comprising a container for liquid fuel adapted to be placed in the fuel line and having an inlet in its bottom and an outlet at its top requiring the chamber to be filled at all times in order to have fuel flow through said outlet, a fuel connection from the upper portion of the chamber to said fuel line beyond said container, a second fuel connection from the lower portion of said container to said fuel line beyond said container, valve means adjacent the lower end of said container for interrupting the flow of fuel to said container and for controlling the flow of fuel through said fuel connections and by means of which fuel may be caused to flow through said chamber and through the first of said connections or the flow of fuel to said chamber interrupted and the fuel already in said chamber permitted to flow by gravity from said chamber and through the second of said connections, an air valve for admitting air into said chamber for facilitating gravity flow of liquid from said chamber, and a member movable to unseat said air valve.

8. A fuel mileage tester comprising a container for liquid fuel adapted to be placed in the fuel line and having an inlet in its bottom and an outlet at its top requiring the chamber to be filled at all times in order to have fuel flow through said outlet, a fuel connection from the upper portion of the chamber to said fuel line beyond said container, a second fuel connection from the lower portion of said container to said fuel line beyond said container, valve means adjacent the lower end of said container for interrupting the flow of fuel to said container and for controlling the flow of fuel through said fuel connections and by means of which fuel may be caused to flow through said chamber and through the first of said connections or the flow of fuel to said chamber interrupted and the fuel already in said chamber permitted to flow by gravity from said chamber and through the second of said connections, actuating means for said valve an air valve for admitting air into said chamber, and a member movable to unseat said air valve, said last mentioned member being connected to said valve actuating means in a manner to be controlled thereby.

WILLIAM SAM COMPTON.

REFERENCES CITED

The following references are of record in the file of this patent:

UNITED STATES PATENTS

| Number | Name | Date |
|---|---|---|
| 1,718,553 | Gauthier | June 25, 1929 |
| 2,309,386 | Gauthier | Jan. 26, 1943 |

FOREIGN PATENTS

| Number | Country | Date |
|---|---|---|
| 654,680 | Germany | Dec. 27, 1937 |